Patented Oct. 7, 1941

2,258,567

UNITED STATES PATENT OFFICE 2,258,567

METHOD FOR CONSERVING FLAVORING MATERIALS

Chester H. Epstein, Highland Park, and Nathan R. Gotthoffer, Grayslake, Ill., assignors to Grayslake Gelatin Co., Grayslake, Ill., a corporation No Drawing. Application September 12, 1938, Serial No. 229,524

3 Claims. (Cl. 99—140)

This invention relates to a method for conserving flavoring materials. It may be carried out in conjunction with natural fruit juices or concentrates thereof or with synthetically prepared flavoring materials or extracts or combinations of the above. The invention is particularly useful in conserving flavors which are designed to be employed in a gelatin dessert composition, but the end-products of the invention may likewise be employed in any food material employing flavor, particularly those foods which at the same time utilize gelatin.

It has always been necessary heretofore to employ highly concentrated flavoring materials in the preparation of gelatin desserts or like products marketed in dry, powdered form. Fresh fruit juices could not be utilized because they contain too high a moisture content which would not be readily absorbed by the other ingredients of the composition. In a gelatin dessert composition these ingredients usually consist of sugar, gelatin, citric or tartaric acid and color. Thus a typical gelatin dessert package as commercially marketed consists of:

| | Grams |
|---|---|
| Sugar | 80 |
| Gelatin | 9 |
| Fruit acid (usually citric or tartaric) | 1.75 |

Flavor and color as desired.

If pure fruit juices were employed as the flavoring material in the above composition, the end-product would be a soggy mass which would soon cake to a very hard product, of poor appearance and difficult to dissolve. If, on the other hand, an attempt is made to dry the mixture before packaging, as by blowing heated air therethrough, a very large percentage of the flavor is lost. This loss has been estimated to be as high as 50% of the flavor and, in addition, the more highly volatile portions of the flavor, known as the "tops," are virtually entirely lost, so that the finished gelatin dessert mixture has not the desired true fruit flavor. Moreover, the composition as marketed heretofore rapidly loses its flavor during storage since the flavor is simply mechanically mixed with the other ingredients and its loss is in no way hindered or retarded.

Likewise when the pure fruit juices or true flavors are concentrated by simple or vacuum evaporation or other well known means a considerable portion of the flavor is lost and again the "tops" are almost completely volatilized. Various methods for overcoming this difficulty of flavor loss have been suggested but none have been entirely satisfactory from every standpoint. Concentration of the flavor by freezing has been proposed but this process is expensive and does not yield satisfactory results.

The employment of capsules for holding the flavor has also been suggested but their employment does not completely prevent loss of flavor, especially of the more highly volatile portions, and also such capsules are apt to shrivel and be difficult to dissolve. Such capsules also detract from the appearance of the composition. The use of flavor buds prepared with crystallized sugar as a coating is likewise open to objection on similar grounds and they are, in addition, difficult to prepare.

Finally, it is further well known that many of the concentrated flavors change in character as they age, even while being stored in bottles, so that it is necessary to employ such flavors as rapidly as possible and long storage periods must be avoided.

It is to overcome the above difficulties that our invention is designed. In a previous application (Serial No. 608,856, filed May 2, 1932) we described the preparation of a flavored gelatin product which was to be used as a base for manufacturing gelatin dessert compositions and which offered a decided improvement over the ordinary gelatin dessert commercially available, particularly as regards storage life. We have now found that both the concentration of the gelatin and the temperatures employed during the processing are critical for optimum results. We have found that in order to preserve completely the flavor including the more highly volatile portions thereof, it is essential that the concentration of gelatin be not less than 1 part gelatin to 5 parts water before the addition of the flavoring material or fruit juice. Where the juices are very dilute and large amounts are employed in conjunction with relatively small amounts of gelatin it will be necessary that the gelatin be dissolved in even greater concentration than 1 part gelatin to 5 parts water, so that the final concentration of the gelatin in the water plus fruit juice shall be of the order of 20% of the liquid and shall not be less than 16% of the total liquid ingredients.

Our present invention may be readily distinguished from our previous application by this increased concentration of gelatin which we claim as a distinguishing feature. Thus in our previous application we employed (Example 1, page 3) 10 pounds of gelatin to 15 gallons of water whereas we now propose to utilize 10 pounds of gelatin to only six gallons of water. By thus reducing the amount of water we obtain a greatly improved product and one which shows practically no loss of flavor. The top portions of the flavor are likewise sealed in and are not dissipated during the subsequent dehydration.

Another feature of our present invention is that we propose to work at relatively low temperatures so that the flavoring material is at no time subjected to a temperature greater than 120° F. We have found that even short periods of heating at temperatures as low as 140° F. result in deterioration of the character of the flavor while more prolonged holding at temperatures above 120° F. is also destructive of flavor. In our present invention we therefore propose to cool the gelatin solution prior to addition of the flavoring material so that the temperature of the gelatin-flavor composition will at no time exceed 120° F.

As examples of the carrying out of our process the following descriptions are given. These examples are not to be regarded as limiting except in so far as herein before indicated.

*Example 1*

100 pounds of pure food gelatin are dissolved in 60 gallons of hot water. The resultant solution is then cooled to 120° F. whereupon 65 pounds of a strawberry flavoring material is added and thoroughly mixed with the gelatin solution. The flavored gelatin solution is then immediately spread in very thin sheets by running onto a belt and cooling under refrigeration to congeal the material. Because of the high concentration of gelatin present the sheets must be very thin to facilitate the subsequent drying process. The congealed sheets are then cut, placed on trays and dried by exposure to a current of air. The temperature of the air is kept low during the first stages of the drying, not exceeding 100° F., and is gradually raised as the moisture content of the material becomes lowered, so that during the last stages of drying it may reach as high as 150° F. The humidity of the air is likewise preferably controlled to a low point so that the drying operation may be carried out with maximum speed. The dried sheets are then crushed and ground to desired size before being used.

*Example 2*

100 pounds of pure food gelatin are added to 100 pounds of lemon juice which have been diluted to 60 gallons with cold water. The liquid is entirely absorbed by the gelatin to form a solid mass which is melted by gentle heating at not over 120° F. When solution is complete the material is spread in thin sheets, congealed and dried as above.

*Example 3*

100 pounds of pure food gelatin are dissolved in 60 gallons of hot water. The resultant solution is then cooled to 120° F. whereupon 1 gallon of orange oil extract flavoring material is added and thoroughly incorporated. The orange oil mixes well with the aqueous gelatin solution, becoming thoroughly emulsified and does not rise to the surface. The flavored gelatin solution is then congealed in sheets and dried as previously described.

*Example 4*

75 pounds of a raspberry flavoring material are diluted to 60 gallons with cold water. To this cold diluted flavoring material are then added 100 pounds of pure food gelatin in the form of coarse granules or flakes. The gelatin entirely absorbs the liquid to form a solid mass which is then dried without being previously melted or heated.

As noted above, these descriptions are given merely by way of example of the carrying out of our process. We do not limit ourselves to the particular flavors or amounts thereof described in these examples nor do we limit ourselves to the particular method of congealing and drying described above. Any known method of drying may be employed but it is important to employ low temperature during the early stages of the drying and also to dry as rapidly as possible. We claim as features of our invention the utilization of relatively high gelatin concentrations and of low temperatures throughout the process. By this means only is the full realization of our invention attained and the original character of the flavor conserved.

Obviously, also, since flavoring materials are usually employed in conjunction with colors, such coloring agents, as for example, certified food colors, may be added to the gelatin solution without altering the essential features of our invention. In like manner other ingredients, such as small amounts of sugar or salt or like material, may be added and we consider such additions along with the flavoring material to lie within the scope of our invention so long as they have no effect on the conservation of flavor by our process. Large amounts of sugar cannot be used because such amounts would greatly retard drying of our flavored gelatin solution and would thus tend to defeat the purpose of our invention. In addition the amount of diluting water employed with the lemon juice in Example 2 or with the raspberry flavor in Example 4 may be varied at will or even entirely omitted if desired, so long as the gelatin is employed in substantially the ratio of one part gelatin to five parts total liquid.

As an illustration of the effectiveness and significance of our invention we cite the following experiment which has been carried out in our laboratory. Samples of the flavored product made in accordance with Example No. 1 above were mixed with the appropriate amounts of sugar, tartaric acid and color to form a standard gelatin dessert mixture. This dessert was then packed in standard gelatin dessert containers, using 3¼ ounces per package, and stored at room temperature. At the same time control packages were also prepared and stored, these differing from the experimental packs only in that unflavored gelatin was used and the flavoring material was added directly to the batch and mixed in by the conventional mechanical mixing procedure.

These packages were then examined at regular intervals dissolving each in one pint of water for the purpose, along with a freshly prepared control, made on each date of examination. After one month of storage the experimental pack was still perfect while the stored control showed a definite loss of flavor. After six months, the experimental batch was still very strong in flavor while the stored control was flat and possessed little flavor. Likewise, the stored control was at this time caked to a solid mass in the package and was no longer considered a marketable product.

After one year of storage the experimental batch was still excellent and was considered superior to a freshly prepared control. In other words, at this time, the original bottle flavoring material itself had deteriorated to a greater extent than the product prepared in accordance with our invention.

What we claim as new and desire to secure by United States Letters Patent is:

1. The method of permanently conserving a flavoring material without altering its original character which consists in adding the flavoring material to an aqueous pure food gelatin solution, then thoroughly mixing the flavor with the gelatin solution, the concentration of the gelatin being not less than 16% of the total liquid ingredients, including flavoring material, then congealing the mixture by cooling, and finally drying the congealed product and grinding the dried material.

2. The method according to claim 1 in which the gelatin solution is cooled to 120° F. before addition of the flavoring material.

3. The method according to claim 1 in which the flavored gelatin solution is spread in the form of a thin sheet and congealed while in this form.

CHESTER H. EPSTEIN.
NATHAN R. GOTTHOFFER.